United States Patent

[11] 3,611,056

| [72] | Inventors | Ferdinando Belloni<br>Milan, Italy; |
|---|---|---|
| [21] | Appl. No. | 39,200 |
| [22] | Filed | May 21, 1970 |
| [45] | Patented | Oct. 5, 1971 |
| [73] | Assignee | Sprague Electric Company, North Adams, Mass. |

[54] ELECTROLYTIC CAPACITOR
6 Claims, 1 Drawing Fig.

[52] U.S. Cl. .................................................... 317/230, 252/62.2
[51] Int. Cl. ..................................................... H01g 9/02
[50] Field of Search ......................................... 317/230, 231, 232, 233; 252/62.2

[56] References Cited
UNITED STATES PATENTS

| 2,965,816 | 12/1960 | Ross | 317/230 |
| 2,994,809 | 8/1961 | Jenney et al. | 317/230 |
| 3,098,182 | 7/1963 | Burnham | 317/230 |
| 3,300,693 | 1/1967 | Ross et al. | 317/230 |
| 3,487,270 | 12/1969 | Alwitt | 317/230 |
| 3,504,237 | 3/1970 | Stahr | 317/230 |
| 3,509,425 | 4/1970 | Jenney et al. | 317/230 |
| 3,546,119 | 12/1970 | Chesnot | 252/62.2 |

Primary Examiner—James D. Kallam
Attorneys—Connolly and Hutz, Vincent H. Sweeney and James Paul O'Sullivan ABSTRACT: An electrolytic capacitor has a capacitance section having a plurality of electrodes, at least one electrode of which is a valve metal having on its surface an insulating oxide layer, said section being impregnated with an electrolyte. The electrolyte comprises a solvent and an ionogen which is a mixture of: (1) the reaction product of a member selected from the group consisting of ammonium hydroxide, an alkali metal hydroxide and an alkaline earth metal hydroxide with a $C_3$–$C_6$ aliphatic polyhydroxy carboxylic acid or the lactone thereof; and (2) boric acid or a salt thereof; wherein the mol ratio of said reaction product to boric acid or salt thereof is between 0.1–2.

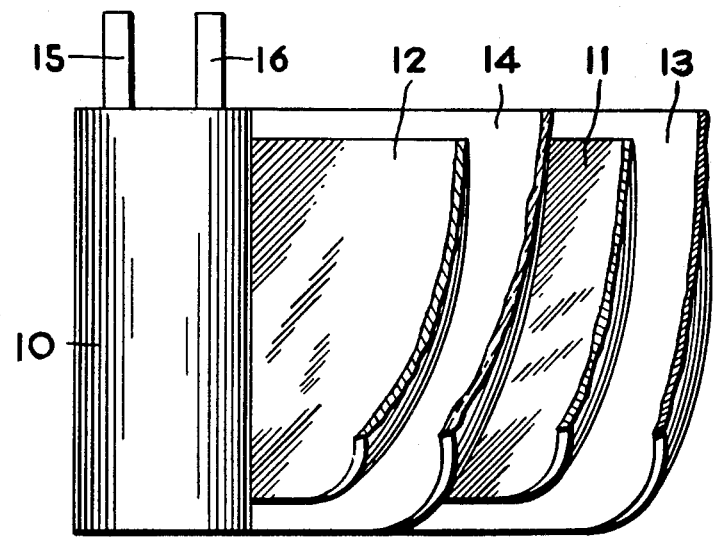

ELECTROLYTIC CAPACITOR

BACKGROUND OF THE INVENTION

The invention is concerned with an electrolytic capacitor and more particularly with a new working electrolyte for such a capacitor.

Few prior art electrolytes for aluminum electrolytic capacitors, other than glycol-containing electrolytes, have high-voltage capabilities, i.e., capabilities greater than 350 volts.

Glycol-containing electrolytes have inherently poor low temperature characteristics and relatively high room temperature resistivities. These electrolytes typically have resistivities of about 900–1000 ohm-cm. at 25° C. As the temperature of use falls below 0° C. and approaches the freezing point of ethylene glycol, the glycol becomes viscous and resistivity greatly increases. As a consequence, there is a sharp decrease in capacitance and a sharp increase in series resistance. The use of electrolyte solvents such as dimethylformamide are eminently better for low temperature use.

It is common knowledge, however, when using various prior art electrolyte solvents, that while resistivity decreases as the amount of solute is increased, formation efficiency, i.e., current efficiency of oxide film formation, is greatly decreased with increased voltage. A desirable electrolyte system is a system which permits one to achieve a low resistivity, while at the same time having a high formation efficiency which is constant with increasing voltage.

It is therefore an object of this invention to present a capacitor employing an electrolyte system capable of maintaining high voltages and capable of rapid aging.

It is a further object of the invention to provide a capacitor employing an electrolyte having comparatively low resistivities at room temperature.

It is yet another object of the invention to present a capacitor employing electrolytes the resistivities of which change comparatively little with change in solute concentration.

It is still another object to provide a capacitor having exceptionally good low temperature characteristics.

Other objects and advantages of the present invention will be made obvious to those skilled in the art by the following description when considered in relation to the appended drawing in which: the sole FIGURE represents a partially wound capacitor section of the present invention.

SUMMARY OF THE INVENTION

The present invention is concerned with an electrolytic capacitor employing a capacitance section having a plurality of electrodes, at least one of which is a valve metal electrode having on its surface an insulating oxide layer. The capacitance section is impregnated with an electrolyte comprising a solvent and an ionogen. The ionogen is a mixture of: (1) the reaction product of a member selected from the group consisting of ammonium hydroxide, an alkali metal hydroxide and an alkaline earth metal hydroxide with a $C_3$–$C_6$ aliphatic polyhydroxy carboxylic acid or the lactone thereof; and (2) boric acid or a salt thereof. The mol ratio of said reaction product to boric acid or a salt thereof is between 0.1–2.

In a preferred embodiment, the reaction product is crystallized from an aqueous solution of a member of the group consisting of dimethylformamide, monomethylformamide, formamide, dimethylacetamide and dimethylpropionamide.

BRIEF DESCRIPTION OF THE DRAWING

The drawing shows a capacitance section 10 in partly unrolled condition. Anode 11 is of a valve metal having on its surface an insulating oxide layer. Cathode 12 may also be a valve metal or of another metal, such as silver. Electrolyte absorbent films 13 and 14, e.g. of Kraft paper, are positioned between the anode and the cathode. Tabs 15 and 16, e.g. of aluminum, are connected to electrodes 11 and 12 respectively to function as terminals for the capacitance section. The electrolyte of the present invention is not shown in the drawing but in use completely impregnates the capacitance section. In use the impregnated section will be housed in a suitable container.

EXAMPLE

A working electrolyte was prepared from delta gluconolactone dissolved in an equal weight of hot water and thereafter a slight excess of 32 percent ammonium hydroxide was added. After cooling, dimethylformamide was slowly added to this solution in an amount sufficient to yield a volume ratio of 1 part $H_2O$ to 5 parts dimethylformamide. The reaction product of this combination was permitted to crystallize from the solution. The reaction product was separated from the system and washed with acetone. The resulting reaction product was dried to constant weight of about 90° C.

Employing equal parts by weight of the reaction product and boric acid, an electrolyte was prepared containing approximately 30 percent by weight of the combined solute in dimethylformamide.

For comparison purposes, a commercial working electrolyte was prepared so as to contain about 64 percent by weight ammonium pentaborate in ethylene glycol.

Two groups of identical aluminum capacitors—five in each group—were prepared. The units were prepared from anodized 3 mil thick aluminum foil, and a counter electrode of etched 1 mil thick unanodized aluminum foil, the electrodes being spaced by three strips of 1 mil thick Kraft paper. The units were convolutely wound and one group was impregnated with the electrolyte of the present invention, while the other group was impregnated with the commercial electrolyte. The capacitors were sealed in aluminum cans employing conventional techniques. The capacitors had a rating of 16 $\mu f$./350 volts.

Both groups were aged at 85° C. The average ampere seconds/farad volts during the aging of the capacitors of the present invention was 743 ampere seconds/farad volts. The average ampere seconds/farad volts during the aging of the units containing the commercial electrolyte was 970 ampere seconds/farad volts. The fact that the capacitors of the present invention aged considerably faster than the prior art units is a significant advantage from a cost standpoint because less energy is required for aging. Furthermore, from the fact that the capacitors of the present invention can be aged faster, it can be inferred that the current efficiency of oxide formation of the subject electrolyte is considerably better than the commercial electrolyte. Greater efficiency means less side reactions in the dielectric oxide during aging.

The electrolytes of the present invention are characterized by comparatively low resistivities at room temperature and there is little change in resistivity with change in concentration. For example, four electrolytes containing equal parts by weight of the reaction product defined above and boric acid were prepared so as to have 10, 20, 30 and 40 percent by weight of the combined solute in dimethylformamide. The respective resistivities at 30° C. of these electrolytes were 421, 445.5, 453.6 and 518.4 ohm centimeters.

By way of comparison, a prior art electrolyte shows the following resistivity change with change in concentration: dimethylformamide with 15 percent by weight of boric acid and 5 percent by weight of citric acid—835 ohm centimeters; with 15 percent by weight boric acid and 10 percent by weight citric acid—584 ohm centimeters; and with 15 percent by weight boric acid and 15 percent by weight citric acid—557 ohm centimeters. The commercial working electrolyte described above, containing 64 percent by weight ammonium pentaborate in ethylene glycol had a resistivity of 1050 ohm centimeters.

The comparatively low resistivity of the electrolyte of the present invention and its very little change with change in concentration are important characteristics because certain prior art electrolytes cannot be used with high solute concentrations without sacrificing the working voltage of the capacitor. With these prior art electrolytes, as solute concentration is increased, resistivity decreases and scintillation voltage is lower. This limits the use of such electrolytes to comparatively low voltage units, i.e., less than 250 volts.

The electrolytes of the present invention containing 10, 20, 30 and 40 percent by weight of the combined solute dimethylformamide were tested for scintillation voltage. These electrolytes were placed in four glass beakers, each containing a strip of plain, 2.7 mil thick, 99.99 percent aluminum foil so that 1 square centimeter of each strip was submerged. Employing a current density of 5 ma per square centimeter, oxide formation proceeded until the voltage across the cells reach a maximum. The average scintillation voltage was 420 volts.

While the specific Example has shown the use of delta gluconolactone as the starting material for the preparation of the reaction product employed in forming the ionogen herein, it is to be understood that other $C_3$-$C_6$ aliphatic polyhydroxy carboxylic acids or the lactones thereof may be employed. The carboxylic acid or lactone thereof must have two vicinal hydroxyl groups capable of assuming a conformation such that the two vicinal groups are cis to one another. Examples of contemplated compounds are meso-tartaric acid, glyceric acid, mannonic acid, sorbic acid, arabonic acid, galactaric acid, etc. and their lactones. In addition to boric acid, salts of boric acid may be employed in forming the ionogen herein, e.g., ammonium borate, sodium borate, etc.

While the specific Example has shown the use of ammonium hydroxide in forming the reaction product between it and the polyhydroxy carboxylic acid or lactone, it is to be understood that any alkali metal or alkaline earth metal hydroxide may be used in place thereof. Examples of such hydroxides are, sodium, potassium and lithium hydroxides; and magnesium, calcium, strontium and barium hydroxides.

The aqueous amide solution employed to effect crystallization of said reaction product, may consist essentially of 1 part $H_2O$ and 2 to 5 parts amide. Best results have been obtained by slowly adding the liquid amide, e.g. dimethylformamide, to the water-reaction product solution.

In forming the ionogen of the present invention the mol ratio range of the reaction product to boric acid is preferably between 0.1–2. The ionogen solute can be present in the electrolyte solvent within a range of from 5–60 percent by weight.

The present invention is not limited to aluminum capacitors but extends to all valve metal capacitors, including but not limited to tantalum, niobium, zirconium, hafnium, titanium and vanadium.

The electrolyte of the present invention may be used with any prior art capacitance section typified by the drawing herein. The sections may be housed in any one of a number of commercially available capacitance containers.

What is claimed is:

1. An electrolytic capacitor comprising a capacitance section having a plurality of electrodes, at least one electrode being a valve metal having on its surface an insulating oxide layer, said section being impregnated with an electrolyte comprising a solvent and an ionogen of a mixture of: (1) the reaction product of a member selected from the group consisting of ammonium hydroxide, an alkali metal hydroxide and an alkaline earth metal hydroxide with a $C_3$-$C_6$ aliphatic polyhydroxy carboxylic acid or the lactone thereof; and (2) boric acid or a salt thereof; wherein the mol ratio of said reaction product to boric acid is between 0.1–2.

2. The capacitor of claim 1 wherein the hydroxide is ammonium hydroxide.

3. The capacitor of claim 2 wherein said reaction product is of ammonium hydroxide and delta gluconolactone.

4. The capacitor of claim 1 wherein said reaction product has been crystallized from an aqueous solution of a member of the group consisting of dimethylformamide, monomethylformamide, formamide, dimethylacetamide and dimethylpropionamide.

5. The capacitor of claim 4 wherein said reaction product is crystallized from aqueous dimethylformamide.

6. The capacitor of claim 5 wherein said aqueous dimethylformamide consists essentially of 1 part $H_2O$ and 2 to 5 parts dimethylformamide.